E. A. LELAND.
PIPE-COUPLING.
No. 178,313.    Patented June 6, 1876.
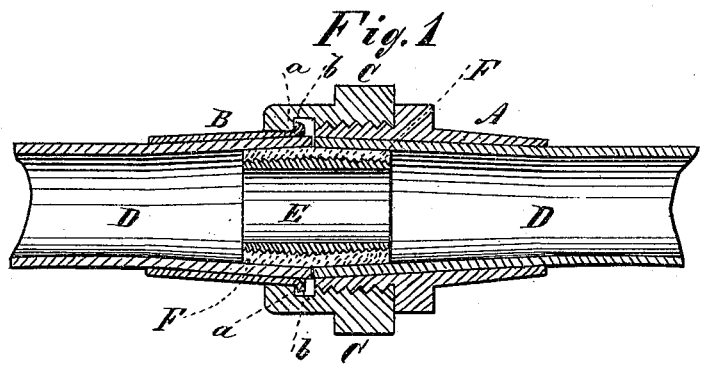
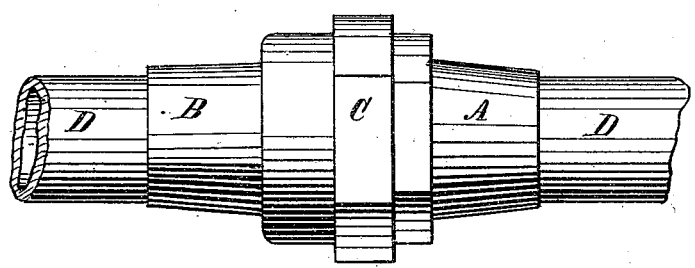
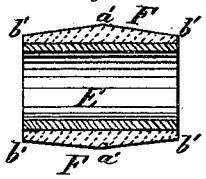 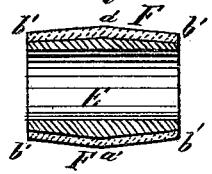 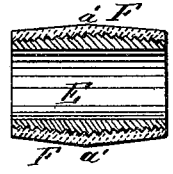
Witnesses:    Inventor:
Henry Eichlings    Edwin A. Leland
Edward Holly    per James H. Whitney
    Atty.

UNITED STATES PATENT OFFICE.

EDWIN A. LELAND, OF NEW YORK, ASSIGNOR TO LEONARD RICHARDSON, OF BROOKLYN, N. Y.

IMPROVEMENT IN PIPE-COUPLINGS.

Specification forming part of Letters Patent No. 178,313, dated June 6, 1876; application filed April 3, 1876.

*To all whom it may concern:*

Be it known that I, EDWIN A. LELAND, of the city, county, and State of New York, have invented an Improvement in Pipe-Couplings, of which the following is a specification:

The object of this invention is to provide a pipe-coupling which shall be more securely packed against leakage than any hitherto constructed, and which shall, moreover, be cheap, simple, durable, and strong.

To this end my invention comprises a doubly-tapered packing-sleeve of india-rubber or other compressible material, in combination with the internal thimble, the sleeve, the two threaded sections of a pipe-coupling, and the flared ends of the lengths or sections of pipe to be joined, the packing-sleeve aforesaid being, in the use and operation of the invention, compressed between the internal-thimble and the flaring ends of the pipe lengths or sections to be joined, which latter are held in position through the agency of the external sleeve and threaded portions of the coupling, whereby the aforesaid object is effectually secured.

Figure 1 is a central longitudinal sectional view of a pipe-coupling made according to my invention. Fig. 2 is a side view of the same. Figs. 3, 4, and 5 are central longitudinal sectional views, showing various modifications of the doubly-tapered packing-sleeve and the internal thimble used in connection therewith.

A is the one section of a pipe or tube coupling, the bore of which is made tapering, as plainly shown in Fig. 1. B is a sleeve or washer, having a taper form corresponding to that of the part A aforesaid. C is the remaining external part or section of the pipe-coupling, and is passed upon the sleeve B in such manner that its shoulder $a$ holds against the flange $b$ of the sleeve B aforesaid. D represents the extremities of the two lengths or sections of pipe to be joined. These extremities are enlarged or made of flaring form, as represented in Fig. 1, in such manner as to fit, one into the sleeve B, the other into the bore of the part A of the coupling. E is a metallic thimble, which may be either of plane or cylindric form, as shown in Fig. 3; or with a plain surface, tapering from the center toward each end, as shown in Fig. 4; or circumferentially corrugated or grooved, and tapering from the center toward each end, as indicated in Figs. 1 and 5. In either case is placed upon this thimble a packing-sleeve, F, which is made of india-rubber or other suitable compressible material. This packing-sleeve is made largest at the center $a'$, and tapers toward each end $b'$, this being its external form. The thimble carrying the packing-sleeve F is thrust one-half into the flared extremity of one of the pipe-sections D, and the other extremity into the correspondingly-flared end of the other pipe-section D. The external part C of the coupling is then screwed upon the other part F thereof, and thereby bringing the two pipe-sections D together, with the packing-sleeve F compressed between the thimble E on the inner side of said packing-sleeve and the flared extremities of the pipe-sections D on the outer side, the packing being thereby firmly compressed between triple surfaces, and effectually packing the joint against the flow of the fluids.

It is of course to be understood that the flared form of the extremities of the pipe-sections D, fitted into the correspondingly-shaped interior of the part A and external sleeve B of the coupling, prevent the two pipe-sections from being drawn apart, the external sleeve B and the part A of the coupling being firmly locked or screwed together by the screwing of the part C upon the aforesaid part A.

What I claim as my invention is—

The packing-sleeve F, tapered from its middle toward its ends, in combination with the internal thimble E, the flared extremities of the pipe-sections D, a tapering external sleeve, B, and the part C F of the coupling, the part F having a tapering bore, the whole constructed, combined, and arranged for operation substantially as and for the purpose herein set forth.

EDWIN A. LELAND.

Witnesses:
H. WELLS, Jr.,
EDWARD HOLLY.